United States Patent [19]

Nishimura et al.

[11] Patent Number: 4,789,707

[45] Date of Patent: Dec. 6, 1988

[54] COATING RESIN COMPOSITION WITH HIGH NUMBER OF IMINO GROUPS

[75] Inventors: Tsutomu Nishimura, Chiba; Yasuo Saito, Kanagawa; Kenji Shindo; Kazutoshi Abe, both of Tokyo, all of Japan

[73] Assignees: Mitsui-Cyanamid Ltd., Tokyo; Nippon Paint Co., Ltd., Osaka, both of Japan

[21] Appl. No.: 20,705

[22] Filed: Mar. 2, 1987

[30] Foreign Application Priority Data

Mar. 7, 1986 [JP] Japan ................................. 61-48244

[51] Int. Cl.$^4$ ............................................. C08L 61/00
[52] U.S. Cl. ..................................... 525/157; 525/160; 525/161; 525/162; 525/163; 525/443
[58] Field of Search ............... 525/161, 162, 443, 157, 525/160, 163

[56] References Cited

U.S. PATENT DOCUMENTS

| | | | |
|---|---|---|---|
| 4,374,164 | 2/1983 | Blank | 427/385.5 |
| 4,575,536 | 3/1986 | Yamada et al. | 525/162 |
| 4,634,738 | 1/1987 | Santer | 525/162 |

FOREIGN PATENT DOCUMENTS

57-40187  8/1982  Japan.

*Primary Examiner*—Theodore E. Pertilla
*Attorney, Agent, or Firm*—Cushman, Darby & Cushman

[57] ABSTRACT

There is disclosed a coating resin composition which contains as a crosslinking agent a melamine-formaldehyde resin which permits a paint to cure at low temperatures, permits a paint to form a coating film flexible enough for the fabrication of the coated substrate, gives off only a small amount of formaldehyde at the time of paint application, and makes it possible to increase the solids content in a paint. The melamine-formaldehyde resin is a mixed alkyl etherified methylol melamine resin, and the other composition-constituting component is an alkyd resin, polyester resin, or vinyl copolymer.

3 Claims, No Drawings

COATING RESIN COMPOSITION WITH HIGH NUMBER OF IMINO GROUPS

BACKGROUND OF THE INVENTION

1. Field of the Invention

The present invention relates to a coating resin composition which contains as a crosslinking agent a melamine-formaldehyde resin which permits a paint to cure at low temperatures, permits a paint to form a coating film flexible enough for the fabrication of the coated substrate, gives off only a small amount of formaline at the time of paint application, and makes it possible to increase the solids content in a paint.

2. Description of the Prior Art

It is known that heat-curing paints include resin compositions composed of an alkyd resin containing carboxyl groups and hydroxyl groups, polyester resin, or acrylic resin, and a melamine-formaldehyde resin (abbreviated as melamine resin hereinafter) obtained by the reaction of melamine with formaldehyde, followed by modification with an alcohol. The melamine resin for this use is usually methyl etherified methylol melamine resin, butyl etherified methylol melamine resin, or mixed alkyl etherified methylol melamine resin (see Japanese Patent Publication No. 40187/1982).

The heat-curing paints as mentioned above, which find use in the fields of precoat metal, automobiles, and home electric appliances, are recently required to meet the following requirements to rationalize coating operations and minimize enironmental pollution.

(1) The baking temperature should be low so as to save energy, reduce costs, and increase efficiency.

(2) The coating film should have sufficient flexibility for the fabrication of the coated substrate. (Galvanized steel sheets and aluminum sheets are factory-finished into coated panels called precoated metal, colored galvanized steel sheet, or colored aluminum sheet. They undergo fabrication such as bending and punching.)

(3) The paint should not give off at the time of application more solvent and formaldehyde than permitted for environmental pollution control. In addition, it should have a high level of solids content.

To meet these requirements, many attempts have so far been made. They include the use of a methylol-rich melamine resin or an acid catalyst where the lowering of baking temperatures is required.

The disadvantage in the former case is that the cured coating film lacks flexibility and fabricability because methylol-rich melamine resin is a polynuclear compound formed by condensation of many melamine nuclei. In addition, a methylol-rich melamine resin is not readily available in the form of high solids content and hence it is not suitable to increase the solids content in a paint. Moreover, a paint containing a methylol-rich melamine resin gives off a large amount of formaldehyde and organic solvents at the time of application.

In the case where an acid catalyst is used, the melamine resin is usually alkyl etherified methylol melamine resin, which is composed mostly of mononuclear molecules, containing a small amount of methylol groups and imino groups. It is available in the form of high solids content. A paint containing it has a high solids content, gives off only a small amount of organic solvents and formaldehyde at the time of application, and provides a coating film flexible enough for the fabrication of the coated substrate. A disadvantage of using an acid catalyst is that it is difficult to balance between the properties of the coating film and the type and amount of the acid catalyst used. Another disadvantage is that the residual acid catalyst in the coating film impairs the water resistance and chemical resistance of the coating film and discolors the coating film. In addition, an acid catalyst in a paint causes the discoloration of pigments, especially basic pigments, and impairs the storage stability of the paint.

There is another type of coating resin composition which provides the coating film which is suitable for the fabrication of the coated substrate and has improved weather resistance and durability. It is composed of a newly developed resin and a miscible methyl etherified methylol melamine resin as a crosslinking agent. The former includes, for example, oil-free alkyd resin or oil-free polyester resin (which contains no or only a little natural oil), high-molecular weight polyester resin, silicopolyester resin, silicoacrylic resin, fluoropolyester resin and fluoroacrylic resin. This coating resin composition, however, has a drawback of giving rise to foams, pinhole, fish-eyes, craters, etc. which impair the appearance of the coating film and the commercial value of the finished products. Presumably this drawback is attributable to the fact that the melamine resin is composed mainly of mononuclear molecules having a low molecular weight.

The requirement that environmental pollution be minimized is being met by revamping the existing coating facilities so that organic solvents and formaldehyde can be recovered and burnt. Needless to say, an ideal solution to this problem is to increase the solids content and lower the formaldehyde content in a paint.

As mentioned above, there have been proposed various kinds of melamine resins to meet the requirements of paints and coating film. However, they are not satisfactory yet. Among them butyl etherified methylol melamine resin is usually composed of polynuclear molecules. Consequently, a paint containing it does not provide a coating film having good flexibility and fabricability. In addition, this melamine resin is not readily available in the form of high solids content so long as it has a viscosity that permits normal handling, and hence it is not suitable to increase the solids content of a paint. A paint containing it gives off a large amount of organic solvents and formaldehyde at the time of application. These disadvantages may be circumvented if a proper production condition is selected so that the condensation of melamine nuclei does not take place and the resulting melamine resin is composed mainly of mononuclear molecules as in methyl etherified methylol melamine resin. However, the thus produced melamine resin requires a high crosslinking temperature and does not satisfy the requirement that the paint should have a low curing temperature.

Another one among the melamine resins is methyl etherified methylol melamine resin. Having a low molecular weight and being composed mainly of mononuclear molecules in most cases, it contributes towards increasing the solids content in a paint and reducing the amount of organic solvents and formaldehyde given off from a paint at the time of application. In addition, it helps to form a coating film superior in flexibility and fabricability because it does not undergo self-condensation appreciably. Moreover, it provides a more glossy coating film than butyl etherified methylol melamine resin. However, it has a drawback of giving rise to foams, pinholes, fish-eyes, craters, etc.

In contrast with the above-mentioned methyl etherified methylol melamine resin and butyl etherified methylol melamine resin, the mixed alkyl etherified methylol melamine resin has many advantages. It is readily available in the form of high solids content, and hence it contributes towards increasing the solids content in a paint and reducing the amount of organic solvents and formaldehyde given off at the time of application. In addition, it provides a coating film superior in flexibility and fabricability. The conventional one, however, is not satisfactory in that it does not permit the paint to be cured at a sufficiently low temperature and that it still gives off an untolerable amount of formalin at the time of application. With the melamine nuclei having a low average molecular weight, the melamine resin gives rise to foams, pinholes, fish-eyes, craters, etc. and does not contribute towards lowering the baking temperature of the paint.

In the case where a methyl etherified methylol melamine resin and a butyl etherified methylol melamine resin are used in combination with each other, the result is better than would be obtained when they are used individually; but it is not quite satisfactory.

In order to eliminate the above-mentioned disadvantages, the present inventors carried out a series of researches, which led to the finding that a coating resin composition containing a specific melamine resin specified below as a crosslinking agent cures at a low baking temperature, gives off only a small amount of organic solvents and formalin at the time of application, and provides a coating film which is free of foams, pinholes, fish-eyes, craters, etc. and superior in flexibility and fabricability. The melamine resin is characterized by that the melamine nucleus has residual imino groups after the reaction with formaldehyde, the formaldehyde bonded to the melamine nucleus is alkoxylated with two or more kinds of alcohols having different numbers of carbon atoms, and the molecule of the melamine resin has an average number of melamine nuclei in a certain range. It was also found that this melamine resin contributes towards increasing the solids content of the paint containing it. The present invention was completed on the basis of these findings.

SUMMARY OF THE INVENTION

Accordingly, it is an object of the present invention to provide a coating resin composition which comprises 5 to 50 parts by weight of mixed alkyl etherified methylol melamine resin having less than 5 bound formaldehyde molecules, 1.0 to 3.5 methyl ether groups, 0.5 to 3.0 butyl ether groups, 0.5 to 3.0 imino groups, and less than 0.5 methylol groups per melamine nucleus on an average, and having an average degree of polymerization for the melamine nuclei in the range of 1.5 to 3.5, and 50 to 95 parts by weight of a copolymer resin composed of a vinyl monomer containing one or more than one kind of hydroxyl group, carboxyl group, glycidyl group, methylolamide group, alkoxymethylolamide group, or thiol group and the other vinyl monomer, or an alkyd resin or polyester resin containing one or two kind of hydroxyl group or carboxyl group, or a mixture thereof, which is reactive with said melamine resin to bring about crosslinking and curing upon heating.

DETAILED DESCRIPTION OF THE INVENTION

The mixed alkyl etherified methylol melamine resin used in the present invention is typified by one which has all of butyl ether groups, methyl ether groups, imino groups, and methylol groups on a single melamine nucleus. It may be used in combination with methyl etherified methylol melamine resin and/or butyl etherified methylol melamine resin and/or mixed alkyl etherified methylol melamine resin other than specified in the present invention, so long as the resulting mixture has the average number of bound formaldehyde molecules, methyl ether groups, butyl ether groups, imino groups, and methylol groups per melamine nucleus and the average degree of polymerization for the melamine nuclei as specified in the invention. In addition, the mixed alkyl etherified methylol melamine resin may be a mixture of mononuclear molecules and polynuclear molecules depending on the manufacturing conditions. It is permissible so long as it satisfies the necessary conditions specified in this invention. This invention includes the above mentioned cases.

The mixed alkyl etherified methylol melamine resin used in the present invention is, for example, produced by heating melamine and formalin under a basic condition to yield methylol melamine and subsequently reacting said methylol melamine with methanol and butanol under an acid condition, or by reacting said methylol melamine with methanol alone to yield methyl etherified methylol melamine resin and then adding butanol to the methyl etherified methylol melamine resin for ether exchange reaction under an acid condition.

In the case where the mixed alkyl etherified methylol melamine resin has five or more bound formaldehyde molecules per melamine nucleus on an average, it is difficult to economically produce the mixed alkyl etherified methylol melamine resin having 0.5 to 3.0 imino groups per melamine nucleus on an average and the average degree of polymerization of 1.5 to 3.5 for the melamine nuclei as specified in the invention. The lower limit of the number of bound formaldehyde molecules should be 3, preferably 4, per melamine nucleus.

The mixed alkyl etherified methylol melamine resin should have 1.0 to 3.5, preferably 1.5 to 3.0 methyl ether groups per melamine nucleus and 0.5 to 3.0, preferably 1.0 to 2.0 butyl ether groups per melamine nucleus, if the resulting coating resin compostion is to provide a coating film superior in gloss, water resistance, chemical resistance, solvent resistance, flexibility, and fabricability, and free of film defects such as craters.

The mixed alkyl etherified methylol melamine resin is required to contain 0.5 to 3.0, preferably 0.5 to 1.5 imino groups per melamine nucleus. With less than 0.5 imino groups, the methylol melamine resin is not effective in lowering the baking temperature of the coating resin compostion. With more than 3 imino groups, the methylol melamine resin is not produced economically because it is necessary to carry out the alkyl etherification in a dilute solution to avoid the polymerization of melamine nuclei. Even though it is available, it impairs the water resistance and acid resistance of the coating film.

If the mixed alkyl etherified methylol melamine resin contains 0.5 or more than 0.5 methylol groups per melamine nucleus, it causes the coating resin composition containing it to give off a large amount of formaldehyde at the time of application. In addition, such methylol melamine resin is poor in storage stability when the solids content is high and adversely affects the stability of the coating composition containing it.

The other component of the coating resin composition, which is an alkyd resin, polyester resin, or copolymer containing specified functional groups, may be any commercial one or conventional one.

According to the invention, the mixed alkyl etherified methylol melamine resin is mixed with the alkyd resin, polyester resin, or copolymer at a ratio of 5-50 to 95-50 (by weight). Outside this range, they do not react completely with each other and the object of the invention is not achieved.

EXAMPLES

The invention is now described in more detail with reference to the following examples, in which "%" and "parts" mean "wt%" and "parts by weight", respectively, unless otherwise specified.

The following methods were used to evaluate the coating film and the storage stability of the coating resin composition and to determine the non-volatile matter in the coating resin composition.

Gloss: According to JIS K5400, 6.7.

Solvent resistance: The coating film is rubbed with a piece of gauze moistened with xylene until the substrate becomes visible, and the number of rubbing motions is recorded.

Erichsen: Indicated by the distance (mm) over which the coated substrate is distended using an Erichsen tester until the coating film is broken.

DuPont: According to JIS K5400, 6.13, Method B. Measured with a weight of 500 g and a hammer having a tip of ½R".

Pencil hardness: According to JIS K5400, 6.14.

Appearance of coating film: Visually rated in five grades according to foams, pinholes, fish-eyes, craters, etc. on the coating film. Excellent ( ⊚ ), Good ( ○ ), Fair (△), Poor (x), Worst (xx).

Can stability: Time required for a sample to flow down from a Ford cup (No. 4) is measured immediately after the preparation of diluted paint and after standing for 16 hours at 60° C. The difference between two measurements is an indication of storage stability.

Non-volatile matter in diluted paint: According to JIS K5400, 8.2.1.

Yellowing: According to JIS K5400, 6.5, using a coated sample which has been baked at 160° C. for 20 minutes. The degree of yellowing (YI) is expressed as follows:

$$YI = D \times 100 = \frac{1.28 X - 1.06Z}{Y} \times 100$$

PRODUCTION EXAMPLE 1

A 1-liter four-mouth flask fitted with a thermometer, stirrer, and reflux condenser was charged with 126 g (1.0 mol) of melamine, 168.75 g (4.5 mol) of 80% paraformaldehyde, and 320 g (10.0 mol) of methanol, and the pH was adjusted to 9.0-9.5 with a 20% aqueous solution of sodium hydroxide. Reactions were carried out under reflux for 60 minutes.

After the completion of reactions, the internal temperature was lowered to 30° C., and 26 ml of 50% sulfuric acid was added and the methyl etherification was carried out at 35° C. for 60 minutes. After the completion of etherification, a 20% aqueous solution of sodium hydroxide was added to adjust the reaction liquid to pH 9.5-10.5. The reaction liquid was condensed under normal pressure by distilling away methanol. When the internal temperature reached 80° C., the condensation was carried out under reduced pressure until methanol was distilled away completely. After the internal temperature was lowered further to 60° C., 320 g (10.0 mol) of methanol was added. While keeping the temperature at 35° C., 26 ml of 50% sulfuric acid was added and methyl etherification was carried out again for 30 minutes. A 20% aqueous solution of sodium hydroxide was added and the reaction liquid was adjusted to pH 9.5-10.5. Condensation under normal pressure and reduced pressure was carried out in the same manner as mentioned above so that methanol was distilled away completely.

Then, the internal temperature was lowered to 60° C., and 277.5 g (3.75 mol) of butanol was added. While keeping the temperature at 45° C., 4.5 ml of 50% sulfuric acid was added and ether exchange reaction was carried out for 2 hours. After the completion of reaction, the reaction liquid was adjusted to pH 9.5-10.5 with a 20% aqueous solution of sodium hydroxide. The reaction liquid was condensed under reduced pressure until neutralized salts separated out and butanol odor disappeared. With the internal temperature lowered to 80° C., 88.8 g (1.2 mol) of butanol was added for dilution and the neutralized salts were filtered with suction. Thus there was obtained a mixed alkyl etherified methylol melamine resin (A-1) containing 80.1% of non-volatile matter. The analytical data of this product are shown in Table 1.

PRODUCTION EXAMPLE 2

The same procedure as in Production Example 1 was repeated except that the amount of 80% paraformaldehyde was changed to 187.5 g (5.0 mol) and the amount of butanol for dilution was changed to 111 g (1.5 mol). There was obtained a mixed alkyl etherified methylol melamine resin (A-2) containing 80% of non-volatile matter. The analytical data of this product are shown in Table 1.

COMPARATIVE PRODUCTION EXAMPLE 1

A 1-liter four-mouth flask fitted with a thermometer, stirrer, and reflux condenser was charged with 126 g (1.0 mol) of melamine, 168.75 g (4.5 mol) of 80% paraformaldehyde, and 320 g (10.0 mol) of methanol, and the pH was adjusted to 9.0-9.5 with a 20% aqueous solution of sodium hydroxide. Reactions were carried out under reflux for 60 minutes.

While keeping the reaction liquid at 35° C. with cooling, 26 ml of 50% sulfuric acid was added and the methyl etherification was carried out for 60 minutes. After the completion of etherification, a 20% aqueous solution of sodium hydroxide was added to adjust the reaction liquid to pH 9.5-10.5. The reaction liquid was condensed under normal pressure by distilling away methanol. When the internal temperature reached 80° C., the condensation was carried out under reduced pressure until methanol was distilled away completely. The reaction liquid was cooled and 320 g (10.0 mol) of methanol was added. While keeping the temperature at 35° C., 26 ml of 50% sulfuric acid was added and methyl etherification was carried out again for 30 minutes. A 20% aqueous solution of sodium hydroxide was added and the reaction liquid was adjusted to pH 9.5-10.5. Condensation under normal pressure and reduced pressure was carried out in the same manner as mentioned above.

Then, the reaction temperature was cooled to 60° C., and the 74 g (1.0 mol) of butanol was added for dilution. Neutralized salts were removed by filtration with suction. Thus there was obtained a methyl etherified methylol melamine resin (B-1) containing 79.7% of non-volatile matter. The analytical data of this product are shown in Table 1.

COMPARATIVE PRODUCTION EXAMPLE 2

A 2-liter four-mouth flask fitted with a thermometer, stirrer, and reflux condenser was charged with 126 g (1.0 mol) of melamine, 168.75 g (4.5 mol) of 80% paraformaldehyde, and 160 g (5.0 mol) of methanol, and the pH was adjusted to 9.0–9.5 with a 20% aqueous solution of sodium hydroxide. Reactions were carried out under reflux for 60 minutes. After the completion of reaction, methanol and water were distilled away under reduced pressure while keeping the internal temperature at 30°–40° C.

Then, 740 g (10 mol) of butanol was added. While keeping the internal temperature at 45° C., 26 ml of 50% sulfuric acid was added and etherification was carried out for 60 minutes. After the completion of etherification, a 20% aqueous solution of sodium hydroxide was added to adjust the reaction liquid to pH 9.5–10.5. The reaction liquid was condensed under reduced pressure with heating. When the internal temperature reached 110° C., the condensation under reduced pressure was suspended and the reaction liquid was cooled. After the internal temperature had lowered to 80° C., 740 g (10 mol) of butanol was added and the reaction liquid was cooled to 40° C. again. 26 ml of 50% sulfuric acid was added and butyl etherification was carried out again at 45° C. for 30 minutes. After the completion of etherification, a 20% aqueous solution of sodium hydroxide was added and the reaction liquid was adjusted to pH 9.5–10.5. Condensation under reduced pressure was carried out with heating until neutralized salts separated out and butanol odor disappeared. 185 g (2.5 mol) of butanol was added for dilution, and neutralized salts were removed by filtration with suction. Thus there was obtained a butyl etherified methylol melamine resin (B-2) containing 70.9% of non-volatile matter. The analytical data of this product are shown in Table 1.

COMPARATIVE PRODUCTION EXAMPLE 3

A 1-liter four-mouth flask fitted with a thermometer, stirrer, and reflux condenser was charged with 126 g (1.0 mol) of melamine, 300 g (8.0 mol) of 80% paraformaldehyde, and 320 g (10.0 mol) of methanol, and the pH was adjusted to 9.0–9.5 with a 20% aqueous solution of sodium hydroxide. Reactions were carried out under reflux for 60 minutes.

While keeping the reaction liquid at 35° C. with cooling, 10.0 ml of 50% sulfuric acid was added and methyl etherification was carried out for 60 minutes. After the completion of reactions, a 20% aqueous solution of sodium hydroxide was added to adjust the reaction liquid to pH 9.5–10.5. The reaction liquid was condensed under normal pressure to distill away methanol. When the internal temperature reached 80° C., the condensation under reduced pressure was carried out so that methanol was distilled away completely. While cooling the reaction liquid, 320 g (10.0 mol) of methanol was added. While keeping the temperature at 35° C., 10.0 ml of 50% sulfuric acid was added and methyl etherification was carried out again. After the completion of etherification, a 20% aqueous solution of sodium hydroxide was added to adjust the reaction liquid to pH 9.5–10.5. Condensation under normal pressure and reduced pressure was carried out in the same manner as mentioned above. The neutralized salts were removed by filtration with suction. Thus there was obtained a methyl etherified methylol melamine resin (B-3) containing 98.5% of non-volatile matter. The analytical data of this product are shown in Table 1.

EXAMPLE 1

A coating resin composition (C-1) was prepared as follows: At first, 140 parts of commercial acrylic resin ("Almatex 785-5", containing 50% non-volatile matter, made by Mitsui Toatsu Chemicals, Inc.) and 100 parts of rutile titanium oxide were mixed by using a three-roll mill. Then, the mixture was further mixed with 37.5 parts of melamine resin (A-1) prepared in Production Example 1. Finally, the mixture was diluted in a thinner (composed of xylene:n-butanol:cellosolve acetate=7:2:1 by weight).

The coating resin composition was applied to a zinc phosphate-treated sheet in such a manner that the coating film has a thickness of 30 μm after drying. Baking was carried out in a hot air oven. The results of evaluation of the coated sheet are given in Table 2.

EXAMPLE 2

A coating resin composition (C-2) was prepared in the same manner as in Example 1, except that the melamine resin (A-1) was replaced by 37.3 parts of melamine resin (A-2) prepared in Production Example 2.

Coating was carried out in the same manner as in Example 1. The results of evaluation of the coated sheet are given in Table 2.

COMPARATIVE EXAMPLE 1

A coating resin composition (C-3) was prepared in the same manner as in Example 1, except that the melamine resin (A-1) was replaced by 37.6 parts of melamine resin (B-1) prepared in Comparative Production Example 1.

Coating was carried out in the same manner as in Example 1. The results of evaluation of the coated sheet are given in Table 2.

COMPARATIVE EXAMPLE 2

A coating resin composition (C-4) was prepared in the same manner as in Example 1, except that the melamine resin (A-1) was replaced by 42.3 parts of melamine resin (B-2) prepared in Comparative Production Example 2.

Coating was carried out in the same manner as in Example 1. The results of evaluation of the coated sheet are given in Table 2.

COMPARATIVE EXAMPLE 3

A coating resin composition (C-5) was prepared in the same manner as in Example 1, except that the melamine resin (A-1) was replaced by 30.5 parts of melamine resin (B-3) prepared in Comparative Production Example 3, and 1.0 part of p-toluenesulfonic acid and 1.5 parts of n-butanol was added.

Coating was carried out in the same manner as in Example 1. The results of evaluation of the coated sheet are given in Table 2.

EXAMPLE 3

A coating resin composition (D-1) was prepared as follows: At first, 116.7 parts of commercial polyester resin ("Almatex P-646", containing 60% non-volatile matter, made by Mitsui Toatsu Chemicals, Inc.) and 100 parts of rutile titanium oxide were mixed by using a three-roll mill. Then, the mixture was further mixed with 37.5 parts of melamine resin (A-1) prepared in Production Example 1. Finally, the mixture was diluted in a thinner (composed of Solvesso #100:methyl isobutyl ketone:cellosolve acetate=80:10:10 by weight).

The coating resin composition was applied to a zinc phosphatetreated sheet in such a manner that the coating film has a thickness of 30 μm after drying. Baking was carried out in a hot air oven. The results of evaluation of the coated sheet are given in Table 3.

EXAMPLE 4

A coating resin composition (D-2) was prepared in the same manner as in Example 3, except that the melamine resin (A-1) was replaced by 37.3 parts of melamine resin (A-2) prepared in Production Example 2.

Coating was carried out in the same manner as in Example 3. The results of evaluation of the coated sheet are given in Table 3.

COMPARATIVE EXAMPLE 4

A coating resin composition (D-3) was prepared in the same manner as in Example 3, except that the melamine resin (A-1) was replaced by 37.6 parts of melamine resin (B-1) prepared in Comparative Production Example 1.

Coating was carried out in the same manner as in Example 3. The results of evaluation of the coated sheet are given in Table 3.

COMPARATIVE EXAMPLE 5

A coating resin composition (D-4) was prepared in the same manner as in Example 3, except that the melamine resin (A-1) was replaced by 42.3 parts of melamine resin (B-2) prepared in Comparative Production Example 2.

Coating was carried out in the same manner as in Example 3. The results of evaluation of the coated sheet are given in Table 3.

COMPARATIVE EXAMPLE 6

A coating resin composition (D-5) was prepared in the same manner as in Example 3, except that the melamine resin (A-1) was replaced by 30.5 parts of melamine resin (B-3) prepared in Comparative Production Example 3, and 1.0 part of p-toluenesulfonic acid and 1.5 parts of n-butanol were added.

Coating was carried out in the same manner as in Example 3. The results of evaluation of the coated sheet are given in Table 3.

EXAMPLE 5

A coating resin composition (E-1) was prepared as follows: At first, 116.7 parts of commercial alkyd resin ("Hariphthal 915-60", containing 60% non-volatile matter, made by Harima Kasei Kogyo Co., Ltd.) and 100 parts of rutile titanium oxide were mixed by using a three-roll mill. Then, the mixture was further mixed with 37.5 parts of melamine resin (A-1) prepared in Production Example 1. Finally, the mixture was diluted in a thinner (composed of Solvesso #100:methyl isobutyl ketone:cellosolve acetate=80:10:10 by weight).

The coating resin composition was applied to a zinc phosphate-treated sheet in such a manner that the coating film has a thickness of 30 μm after drying. Baking was carried out in a hot air oven. The results of evaluation of the coated sheet are given in Table 4.

EXAMPLE 6

A coating resin composition (E-2) was prepared in the same manner as in Example 5, except that the melamine resin (A-1) was replaced by 37.3 parts of melamine resin (A-2) prepared in Production Example 2.

Coating was carried out in the same manner as in Example 5. The results of evaluation of the coated sheet are given in Table 4.

COMPARATIVE EXAMPLE 7

A coating resin composition (E-3) was prepared in the same manner as in Example 5, except that the melamine resin (A-1) was replaced by 37.6 parts of melamine resin (B-1) prepared in Comparative Production Example 1.

Coating was carried out in the same manner as in Example 5. The results of evaluation of the coated sheet are given in Table 4.

COMPARATIVE EXAMPLE 8

A coating resin composition (E-4) was prepared in the same manner as in Example 5, except that the melamine resin (A-1) was replaced by 42.3 parts of melamine resin (B-2) prepared in Comparative Production Example 2.

Coating was carried out in the same manner as in Example 5. The results of evaluation of the coated sheet are given in Table 4.

COMPARATIVE EXAMPLE 9

A coating resin composition (E-5) was prepared in the same manner as in Example 5, except that the melamine resin (A-1) was replaced by 30.5 parts of melamine resin (B-3) prepared in Comparative Production Example 3, and 1.0 part of p-toluenesulfonic acid and 1.5 parts of n-butanol were added.

Coating was carried out in the same manner as in Example 5. The results of evaluation of the coated sheet are given in Table 4.

EXAMPLE 7

A coating resin composition (F-1) was prepared as follows: At first, 50 parts of polyester resin varnish (containing 65% solids, produced by diluting with xylene a condensation product composed of 332 parts of isophthalic acid, 158 parts of adipic acid, 138 parts of 1,6-hexanediol, 151 parts of neopentyl glycol, 80 parts of trimethylol propane, and 83 parts of Cardura E), 100 parts of rutile titanium oxide, 0.1 parts of carbon black, 8 parts of Solvesso 100 (made by Exxon), and 4 parts of butyl cellosolve were mixed by using a three-roll mill. Then, the mixture was further mixed with 57.7 parts of the above-mentioned polyester resin varnish, 37.5 parts of melamine resin (A-1) prepared in Production Example 1, 20 parts of 50% solution of Epikote 1001 (made by Shell Chemical) in cellosolve acetate, and 0.2 parts of Modaflow (made by Monsanto).

The mixture was diluted with a thinner (composed of toluol/Solvesso 100/Solvesso 150=4/3/3) so that a viscosity of 25 sec/20° C. (No. 4 Ford cup) is obtained.

The coating resin composition as applied by spraying to a zinc phosphate-treated, cation-electrodeposited dull steel sheet, measuring 0.8×100×300 mm, in such a manner that the coating film has a thickness of 40 μm after drying. Baking was carried out in a hot air oven.

The results of evaluation of the coated sheet are given in Table 5.

EXAMPLE 8

A coating resin composition (F-2) was prepared in the same manner as in Example 7, except that the melamine resin (A-1) was replaced by 20 parts of melamine resin (A-1) and 19.7 parts of melamine resin (B-2).

Coating was carried out in the same manner as in Example 7. The results of evaluation of the coated sheet are given in Table 5.

COMPARATIVE EXAMPLE 10

A coating resin composition (F-3) was prepared in the same manner as in Example 7, except that the melamine resin (A-1) was replaced by 37.6 parts of melamine resin (B-1).

Coating was carried out in the same manner as in Example 7. The results of evaluation of the coated sheet are given in Table 5.

COMPARATIVE EXAMPLE 11

A coating resin composition (F-4) was prepared in the same manner as in Example 7, except that the melamine resin (A-1) was replaced by 42.3 parts of melamine resin (B-2).

Coating was carried out in the same manner as in Example 7. The results of evaluation of the coated sheet are given in Table 5.

COMPARATIVE EXAMPLE 12

A coating resin composition (F-5) was prepared in the same manner as in Example 7, except that the melamine resin (A-1) was replaced by 30.5 parts of melamine resin (B-3), and 1.0 part of p-toluenesulfonic acid and 1.5 parts of n-butanol were added.

Coating was carried out in the same manner as in Example 7. The results of evaluation of the coated sheet are given in Table 5.

EXAMPLE 9

A coating resin composition (G-1) was prepared as follows: At first, 50 parts of alkyd resin varnish (containing 60% solids, produced by diluting with xylene a condensation product composed of 21.05 parts of phthalic anhydride, 23.61 parts of isophthalic acid, 16.80 parts of trimethylolpropane, 6.21 parts of neopentyl glycol, 3.83 parts of ethylene glycol, 18.44 parts of coconut oil, and 10.59 parts of Cardura E), 100 parts of rutile titanium oxide, and 12 parts of Solvesso 100 (made by Exxon) were mixed by using a three-roll mill. Then, the mixture was further mixed with 66.7 parts of the above-mentioned alkyd resin varnish, 37.5 parts of melamine resin (A-1), and 0.2 parts Modaflow.

The mixture was diluted with a thinner (composed of methyl isobutyl ketone/Solvesso 100/Solvesso 150=2/4/4) so that a viscosity of 24 sec/20° C. (no. 4 Ford cup) is obtained.

The coating resin composition was applied by spraying to a zinc phosphate-treated, cation-electrodeposited, inter-coated (made by Nippon Paint Co., Ltd., Orga OP-2 Gray) dull steel sheet, measuring 0.8×100×300 mm, in such a manner that the coating film has a thickness of 35 μm after drying. Baking was carried out in a hot air oven. The results of evaluation of the coated sheet are given in Table 6.

EXAMPLE 10

A coating resin composition (G-2) was prepared in the same manner as in Example 9, except that the melamine resin (A-1) was replaced by 25.0 parts of melamine resin (A-1) and 14.1 parts of melamine resin (B-2).

Coating was carried out in the same manner as in Example 9. The results of evaluation of the coated sheet are given in Table 6.

COMPARATIVE EXAMPLE 13

A coating resin composition (G-3) was prepared in the same manner as in Example 9, except that the melamine resin (A-1) was replaced by 37.6 parts of melamine resin (B-1).

Coating was carried out in the same manner as in Example 9. The results of evaluation of the coated sheet are given in Table 6.

COMPARATIVE EXAMPLE 14

A coating resin composition (G-4) was prepared in the same manner as in Example 9, except that the melamine resin (A-1) was replaced by 42.3 parts of melamine resin (B-2).

Coating was carried out in the same manner as in Example 9. The results of evaluation of the coated sheet are given in Table 6.

COMPARATIVE EXAMPLE 15

A coating resin composition (F-5) was prepared in the same manner as in Example 9, except that the melamine resin (A-1) was replaced by 30.5 parts of melamine resin (B-3), and 1.0 part of p-toluenesulfonic acid and 1.5 parts of n-butanol were added.

Coating was carried out in the same manner as in Example 9. The results of evaluation of the coated sheet are given in Table 6.

EXAMPLE 11

A coating composition (H-1-1) was prepared as follows: At first, 100 parts of acrylic resin varnish A (containing 50% non-volatile matter, having a number-average molecular weight of 18000, produced by polymerizing in a mixed solvent of 90 parts of xylene and 10 parts of methyl isobutyl ketone 1.8 parts of methacrylic acid, 39.4 parts of methyl methacrylate, 43.6 parts of ethyl acrylate, 3.2 parts of isobutyl acrylate, 12.0 parts of 2-hydroxyethyl acrylate, and 1.8 parts of azobisisobutyronitrile), 13 parts of aluminum paste 1109MA (made by Toyo Aluminum), and 0.3 parts of Modaflow were mixed by using a dispersion mixer. The mixture was diluted with a thinner (composed of cellosolve acetate/butyl acetate/xylene=3/5/2) so that a viscosity of 15 sec/20° C. (No. 4 Ford cup) is obtained.

Then, a coating composition (H-1-2) was prepared as follows: At first, 100 parts of acrylic resin varnish B (containing 50% non-volatile matter, having a number-average molecular weight of 3400, produced by polymerizing in a mixed solvent of 80 parts of xylene and 20 parts of n-butanol 30 parts of styrene, 45.2 parts of ethyl hexyl methacrylate, 16.2 pars of 2-hydroxymethacrylate, 3.1 parts of methacrylic acid, and 4.5 parts of azobisisobutyronitrile), 39.0 parts of melamine resin (A-1), 1 part of Tinuvin 900 (made by Ciba-Geigy Corp.), 1 part of Sanol LS-292 (made by Sankyo), and 0.3 parts of Modaflow were mixed by using a dispersion mixer. The mixture was diluted with a thinner (composed of xylene/Solvesso 100=1/1) so that a viscosity of 25 sec/20° C. (No. 4 Ford cup) is obtained.

The diluted coating composition (H-1-1) was applied twice to a zinc phosphate-treated, cation-electrodeposited, inter-coated dull steel sheet, measuring 0.8×100×300 mm, in such a manner that the coating film has a thickness of 20 μm after drying. Three minutes later, the diluted coating composition (H-1-2) was applied further (wet-on-wet) in such a manner that the coating film has a thickness of 35 μm after drying. The applied film was baked. The results of evaluation of the coated sheet are given in Table 7.

EXAMPLE 12

Coating compositions (H-2-1) and (H-2-2) were prepared in the same manner as in Example 11, except that 20.8 parts of melamine resin (A-1) was replaced by 12.5 parts of melamine resin (A-1) and 9.4 parts of melamine resin (B-2), and 39.0 parts of melamine resin (A-1) was replaced by 23.4 parts of melamine resin (A-1) and 17.6 parts of melamine resin (B-2).

Coating was carried out in the same manner as in Example 11. The results of evaluation of the coated sheet are given in Table 7.

COMPARATIVE EXAMPLE 16

Coating compositions (H-3-1) and (H-3-2) were prepared in the same manner as in Example 11, except that 20.8 parts of melamine resin (A-1) was replaced by 20.9 parts of melamine resin (B-1) and 39.0 parts of melamine resin (A-1) was replaced by 39.2 parts of melamine resin (B-1).

Coating was carried out in the same manner as in Example 11. The results of evaluation of the coated sheet are given in Table 7.

COMPARATIVE EXAMPLE 17

Coating compositions (H-4-1) and (H-4-2) were prepared in the same manner as in Example 11, except that 20.8 parts of melamine resin (A-1) was replaced by 23.5 parts of melamine resin (B-2) and 39.0 parts of melamine resin (A-1) was replaced by 44.1 parts of melamine resin (B-2).

Coating was carried out in the same manner as in Example 11. The results of evaluation of the coated sheet are given in Table 7.

COMPARATIVE EXAMPLE 18

Coating compositions (H-5-1) and (H-5-2) were prepared in the same manner as in Example 11, except that 20.8 parts of melamine resin (A-1) was replaced by 16.9 parts of melamine resin (B-3) and 0.3 part of p-toluenesulfonic acid and 1.0 parts of n-butanol were added, and 39.0 parts of melamine resin (A-1) was replaced by 31.7 parts of melamine resin (B-3) and 0.3 part of p-toluenesulfonic acid and 1.0 parts of n-butanol.

Coating was carried out in the same manner as in Example 11. The results of evaluation of the coated sheet are given in Table 7.

As mentioned above, the coating resin composition of the invention cures at low temperatures and provides coating film superior in physical properties and fabricability. In addition, it gives off only a little formaldehyde and is available in the form of high solids content. It is useful as a paint for automobiles, home electric appliances, or coil coating, etc.

TABLE 1

| | Production example | | | | |
|---|---|---|---|---|---|
| | Production example 1 | Production example 2 | Comparative Production example 1 | Comparative Production example 2 | Compartive Production example 3 |
| | | | Product | | |
| Item | A-1 | A-2 | B-1 | B-2 | B-3 |
| Non volatile % (105° C. × 3 hrs) | 80.1 | 80.5 | 79.7 | 70.9 | 98.5 |
| Viscosity 25° C. (Gardner · Halt) | X-Y | T-U | Z-$Z_1$ | $Z_2$-$Z_3$ | Y-Z |
| Combined formaldehyde | 4.15 | 4.65 | 4.15 | 4.15 | 5.50 |
| Methyl ether group | 2.10 | 2.40 | 3.50 | — | 5.05 |
| Butyl ether group | 1.40 | 1.60 | — | 3.35 | — |
| Methylol group | 0.20 | 0.20 | 0.35 | 0.45 | 0.20 |
| Imino group | 1.10 | 0.90 | 1.20 | 0.85 | ≈0 |
| Methylene group | 0.65 | 0.50 | 0.60 | 1.05 | 0.25 |
| Free formaldehyde % | 0.08 | 0.05 | 0.35 | 0.40 | 0.12 |
| Average degree of polymerization | 2.4 | 2.3 | 2.3 | 2.8 | 1.45 |

TABLE 2

| | | Paint | Baking Condition °C. × min | Gloss (%) | Solvent resistance (number) | Enrichsen (mm) | du Pont (cm) | Pencil hardness | Appearance |
|---|---|---|---|---|---|---|---|---|---|
| Example | 1 | C-1 | 160 × 20 | 83 | 50< | 5.5 | 50< | 3H | ○ |
| | | | 140 × 20 | 89 | 50< | 6.0< | 50< | 2H | ◉ |
| | | | 120 × 20 | 92 | 50< | 6.0< | 50< | H | ◉ |
| | 2 | C-2 | 160 × 20 | 85 | 50< | 5.8 | 50< | 2H | ○ |
| | | | 140 × 20 | 90 | 50< | 6.0< | 50< | H | ◉ |
| | | | 120 × 20 | 93 | 50< | 6.0< | 50< | H | ◉ |
| Comparative example | 1 | C-3 | 160 × 20 | 86 | 50< | 5.0 | 50< | 3H | X X |
| | | | 140 × 20 | 90 | 50< | 5.8 | 50< | 2H | △ |
| | | | 120 × 20 | 94 | 50< | 6.0< | 50< | H | ○ |
| | 2 | C-4 | 160 × 20 | 78 | 50< | 4.0 | 35 | 3H | ○ |
| | | | 140 × 20 | 83 | 50< | 4.7 | 40 | 2H | ○ |
| | | | 120 × 20 | 88 | 40 | 6.0< | 50< | H | ◉ |

TABLE 2-continued

| | | Paint | Baking Condition °C. × min | Gloss (%) | Solvent resistance (number) | Erichsen (mm) | du Pont (cm) | Pencil hardness | Appearance |
|---|---|---|---|---|---|---|---|---|---|
| | 3 | C-5 | 160 × 20 | 90 | 50< | 6.0< | 50< | 3H | X X |
| | | | 140 × 20 | 94 | 45 | 6.0< | 50< | H | X |
| | | | 120 × 20 | 97 | 30 | 6.0< | 50< | HB | |

TABLE 3

| | | Paint | Baking Condition °C. × min | Gloss (%) | Solvent resistance (number) | Erichsen (mm) | du Pont (cm) | Pencil hardness | Appearance |
|---|---|---|---|---|---|---|---|---|---|
| Example | 3 | D-1 | 160 × 20 | 85 | 50< | 6.0< | 50< | 2H | O |
| | | | 140 × 20 | 93 | 50< | 6.0< | 50< | H | O |
| | | | 120 × 20 | 94 | 50< | 6.0< | 50< | H | O |
| | 4 | D-2 | 160 × 20 | 86 | 50< | 6.0< | 50< | 2H | O |
| | | | 140 × 20 | 93 | 50< | 6.0 | 50< | H | O |
| | | | 120 × 20 | 95 | 50< | 6.0< | 50< | F | O |
| Comparative example | 4 | D-3 | 160 × 20 | 88 | 50< | 5.6 | 45 | 2H | X X |
| | | | 140 × 20 | 95 | 50< | 6.0< | 50< | H | Δ |
| | | | 120 × 20 | 97 | 38 | 6.0< | 50< | H | O |
| | 5 | D-4 | 160 × 20 | 80 | 50< | 5.2 | 40 | 2H | O |
| | | | 140 × 20 | 87 | 50< | 5.8 | 45 | °H | O |
| | | | 120 × 20 | 90 | 30 | 6.0< | 50< | HB | O |
| | 6 | D-5 | 160 × 20 | 90 | 50< | 6.0< | 50< | 2H | X X |
| | | | 140 × 20 | 96 | 40 | 6.0< | 50< | H | X |
| | | | 120 × 20 | 98 | 30 | 6.0< | 50< | HB | O |

TABLE 4

| | | Paint | Baking Condition °C. × min | Gloss (%) | Solvent resistance (number) | Erichsen (mm) | du Pont (cm) | Pencil hardness | Appearance |
|---|---|---|---|---|---|---|---|---|---|
| Example | 5 | E-1 | 160 × 20 | 88 | 50< | 6.0< | 50< | 3H | O |
| | | | 140 × 20 | 95 | 50< | 6.0< | 50< | 2H | O |
| | | | 120 × 20 | 97 | 50< | 6.0< | 50< | H | O |
| | 6 | E-2 | 160 × 20 | 90 | 50< | 6.0< | 50< | 2H | O |
| | | | 140 × 20 | 96 | 50< | 6.0< | 50< | H | O |
| | | | 120 × 20 | 99 | 50< | 6.0< | 50< | H | O |
| Comparative example | 7 | E-3 | 160 × 20 | 92 | 50< | 5.5 | 45 | 3H | X X |
| | | | 140 × 20 | 98 | 50< | 6.0< | 50< | 2H | Δ |
| | | | 120 × 20 | 99 | 50< | 6.0< | 50< | H | O |
| | 8 | E-4 | 160 × 20 | 84 | 50< | 5.1 | 40 | 3H | O |
| | | | 140 × 20 | 88 | 50< | 5.8 | 45 | 2H | O |
| | | | 120 × 20 | 93 | 40 | 6.0< | 50< | HB | O |
| | 9 | E-5 | 160 × 20 | 93 | 50< | 6.0< | 50< | 3H | X X |
| | | | 140 × 20 | 98 | 50< | 6.0< | 50< | 2H | X |
| | | | 120 × 20 | 99 | 30 | 6.0< | 50< | HB | O |

TABLE 5

| | | Paint | Gloss (%) | du Pont (cm) | Pencil hardness | Appearance | Yellowing | Can Stability (Sec) | Non volatile of applicated paint (%) |
|---|---|---|---|---|---|---|---|---|---|
| Example | 7 | F-1 | 90 | 50< | H | O | −0.11 | 2 | 65.4 |
| | 8 | F-2 | 90 | 50< | H | O | −0.12 | 2 | 62.7 |
| Comparative example | 10 | F-3 | 90 | 50< | H | X X | −0.10 | 2 | 65.5 |
| | 11 | F-4 | 85 | 40 | H | O' | −0.11 | 2 | 60.2 |
| | 12 | F-5 | 87 | 50< | H | X | 4.87 | 21 | 66.1 |

TABLE 6

| | | Paint | Gloss (%) | du Pont (cm) | Pencil hardness | Appearance | Yellowing | Can Stability (Sec) | Non volatile of applicated paint (%) |
|---|---|---|---|---|---|---|---|---|---|
| Example | 9 | G-1 | 92 | 40 | H | O | 0.23 | 2 | 62.3 |
| | 10 | G-2 | 92 | 40 | H | O | 0.31 | 2 | 60.9 |
| Comparative example | 13 | G-3 | 92 | 40 | H | X X | 0.33 | 2 | 62.1 |
| | 14 | G-4 | 91 | 30 | H | O | 0.26 | 2 | 57.5 |
| | 15 | G-5 | 90 | 40 | H | X | 7.48 | 18 | 63.2 |

TABLE 7

|  |  | Paint | Gloss (%) | du Pont (cm) | Pencil hardness | Appearance | Yellowing | Can Stability (Sec) | Non volatile of applicated paint (%) |
|---|---|---|---|---|---|---|---|---|---|
| Example | 11 | H-1-1 | 94 | 30 | H | ◯ | 1.21 | 3 | 30.0 |
|  |  | H-1-2 |  |  |  |  |  | 3 | 50.1 |
|  | 12 | H-2-1 | 94 | 30 | H | ◯ | 1.19 | 3 | 28.1 |
|  |  | H-2-2 |  |  |  |  |  | 3 | 47.8 |
| Comparative example | 16 | H-3-1 | 94 | 30 | H | X | 1.24 | 3 | 29.5 |
|  |  | H-3-2 |  |  |  |  |  | 3 | 49.7 |
|  | 17 | H-4-1 | 94 | 20 | H | ◯ | 1.26 | 3 | 24.3 |
|  |  | H-4-2 |  |  |  |  |  | 3 | 43.2 |
|  | 18 | H-5-1 | 92 | 30 | H | △ | 5.47 | 10 | 30.4 |
|  |  | H-5-2 |  |  |  |  |  | 12 | 50.8 |

What is claimed is:

1. A coating resin composition which comprises 5 to 50 parts by weight of mixed alkyl etherified methylol melamine resin having less than 5 bound formaldehyde molecules, 1.0 to 3.5 methyl ether groups, 0.5 to 3.0 butyl ether groups, 0.5 to 3.0 imino groups, and less than 0.5 methylol groups per melamine nucleus on an average, and having an average degree of polymerzation for the melamine nuclei in the range of 1.5 to 3.5, and 50 to 95 parts by weight of a copolymer resin composed of a vinyl monomer containing one or more than one kind of hydroxyl group, carboxyl group, glycidyl group, methylolamide group, alkoxymethlolamide group, or thiol group and the other vinyl monomer, or an alkyd resin or polyester resin containing one or two kinds of hydroxyl group or carboxyl group, or a mixture thereof, which is reactive with said melamine resin to bring about crosslinking and curing upon heating.

2. The composition of claim 1 wherein the mixed alkyl etherified methylol melamine resin is a mixture of mononuclear molecules and polynuclear molecules.

3. The composition of claim 1 wherein the mixed alkyl etherified methylol melamine resin is used in combination with one or more resins selected from the group consisting of methyl etherified methylol melamines, butyl etherified methylol melamines, and alkly etherified methylol melamines other than recited in claim 1.

* * * * *